US008717973B2

(12) United States Patent
Ito et al.

(10) Patent No.: US 8,717,973 B2
(45) Date of Patent: May 6, 2014

(54) LOCATION INFORMATION MANAGEMENT METHOD AND LOCATION MANAGEMENT SYSTEM

(75) Inventors: Yuji Ito, Fukuoka (JP); Hiroya Tomita, Fukuoka (JP); Masatoshi Kaneko, Fukuoka (JP); Shinichi Kuranari, Fukuoka (JP); Takayuki Nakamura, Fukuoka (JP); Yuji Ito, Fukuoka (JP); Masataka Mukaihara, Fukuoka (JP); Norio Nakamoto, Sunnyvale, CA (US); Tomoyuki Uekado, Fukuoka (JP); Keiichirou Etou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1510 days.

(21) Appl. No.: 11/898,710

(22) Filed: Sep. 14, 2007

(65) Prior Publication Data
US 2008/0046525 A1 Feb. 21, 2008

Related U.S. Application Data

(63) Continuation of application No. PCT/JP2005/004630, filed on Mar. 16, 2005.

(51) Int. Cl.
H04W 4/00 (2009.01)
H04L 12/66 (2006.01)
H04M 3/42 (2006.01)

(52) U.S. Cl.
USPC .................. 370/328; 370/356; 379/211.02

(58) Field of Classification Search
None
See application file for complete search history.

(56) References Cited

U.S. PATENT DOCUMENTS

2002/0114434 A1* 8/2002 Fujisawa et al. ......... 379/114.01
2005/0013426 A1 1/2005 Ooki

FOREIGN PATENT DOCUMENTS

| JP | 2000-134336 | 5/2000 |
|----|-------------|--------|
| JP | 2002-169776 | 6/2002 |
| JP | 2002-259648 | 9/2002 |
| JP | 2002-534914 | 10/2002 |
| JP | 2004-304293 | 10/2004 |
| JP | 2004-318529 | 11/2004 |
| JP | 2005-018194 | 1/2005 |

* cited by examiner

Primary Examiner — Melanie Jagannathan
(74) Attorney, Agent, or Firm — Fujitsu Patent Center

(57) ABSTRACT

In the presence information management method of the present invention, the e-mail address of the user and the terminal address of a terminal are extracted upon receipt of an e-mail transmission request, the e-mail address and terminal address correspondence table is retrieved by using the extracted e-mail address, and the extracted terminal address is registered in the e-mail address and terminal address correspondence table if the retrieved terminal address does not correspond to the extracted terminal address. Thus, the user can automatically update presence information with his/her e-mail transmission request.

8 Claims, 11 Drawing Sheets

LOCATION INFORMATION MANAGEMENT METHOD AND LOCATION MANAGEMENT SYSTEM

CROSS-REFERENCE TO RELATED APPLICATION

This application is a U.S. continuation application filed under 35 U.S.C. 111(a) claiming benefit under 35 U.S.C. 120 and 365(c) of PCT application JP2005/004630, filed Mar. 16, 2005. The foregoing application is hereby incorporated herein by reference.

BACKGROUND OF THE INVENTION

1. Field of the Invention

The present invention relates to presence information management methods and presence information management systems and, in particular, to a presence information management method and a presence information management system for managing the presence information of the user.

2. Description of the Related Art

Although the use of e-mail has been popular as communication means between bases with the spread of networks, there are still many occasions to make phone calls as communication means for sure contact or in emergencies.

In a company or the like which has many bases or business establishments and is equipped with telephones and an in-company LAN (Local Area Network), when an employee wants to contact a person who happens to be in a separate base or a business establishment, he/she may use the e-mail address of the person he/she wants to talk to. In making a phone call on the phone, on the other hand, it is necessary for the employee to call the number of the telephone on the desk of the person. When the person is not at his/her desk, however, the employee would have to ask where the person is, have the call transferred to the person's location, or make a new call to the person's location.

In this case, information in advance as to whether the person in question is present or absent will save time and labor in contacting the person in question. A server providing the so-called presence information which informs whether the person to be called is at his/her desk or elsewhere is called a presence server.

The means of the presence server to automatically collect presence information includes a method of using a sensor to sense presence, a method of retrieving the records of the user who has used GPS (Global Positioning System), a wireless LAN, and FeliCa (non-contact IC card technology) and of specifying the presence information of the user, and a method of using fingerprint seal data.

Further, with a mobile phone, it is possible to easily collect presence information such as positional information of the user using the mobile phone through the use of the information of a base station in communication with the mobile phone and GPS. However, when these methods are actually introduced into a company or the like, it is necessary to develop an infrastructure such as a sensor.

Further, even when mobile phones are to be used, it is costly to supply mobile phones to all employees. Making a phone call from a company land line to a mobile phone costs more money than making a call to a land line. In terms of cost, the system of using mobile phones is not applicable to all companies.

The function to know of the presence information of the other party without newly introducing the above-described infrastructures including the presence server is provided by an instant messaging (IM) service using a Web server and groupware. Note, however, that most of these necessitate the user to input his/her presence information point by point when he/she is expected to be absent or change his/her location. Further, it is necessary to install a tool for providing information in the terminals of all the users involved.

Further, there is a method of sensing presence with a sensor and notifying the telephone server of the result thus sensed, thereby acquiring information on the other party to whom the caller wants to make a call. (see, e.g., patent document 1).

Further, patent document 2 describes a connection technique by which connections between clients is automatically established while managing an IP address to make IP (Internet Protocol) telephony or the like available for actual use.

In patent document 3, there is described the status management of a seat performed between a client and a server via a network, which has the function of automatic registration/deletion, etc., of the seat.

In patent document 4, there is described a technique by which a telephone number and an IP address are associated with each other to facilitate communications on the Internet.

[Patent Document 1] JP-A-2000-134336
[Patent Document 2] JP-A-2002-169776
[Patent Document 3] JP-A-2002-259648
[Patent Document 4] JP-A-2002-534914

SUMMARY OF THE INVENTION

In a company or the like which has many bases or business establishments and is equipped with telephones and an in-company LAN (Local Area Network), examples of a method of installing a presence server for collecting and managing the presence information of employees and of collecting the presence information include the introduction of a facility for collecting information or the installation of software in the terminals of all employees as described above.

However, the former method involves a higher introduction cost. Although the latter method can reduce the introduction cost as compared with the former one, it includes installing the software in all the terminals, thereby generating a corresponding maintenance cost.

In a company or the like which has many bases or business establishments and is equipped with telephones and an in-company LAN (Local Area Network), a mailing list is usually used when information is provided by e-mail to all members of a group on a department or project basis through the in-company LAN. Generally, for a business communication of this kind, a registered mailing list is used to provide information to those organizationally affiliated with or otherwise enrolled in the group.

Now, when there is information on a power outrage or a disaster occurring at base A which is to be provided only to those present at base A, a mailing list containing those involved in base A is used to provide information by e-mail.

However, since employees who are in base A on a business trip from other bases are not included in the mailing list prepared by the enrolling base (base A), they will not be notified of the e-mail. Further, those who make a business trip to another base from base A, where they are enrolled, will be given this e-mail to no purpose. Such a problem can be avoided if information on those on a business trip is reflected point by point in the mailing list. However, it is cumbersome and impractical to add to and delete from the mailing list whenever they make a short business trip.

The technique of patent document 2 has a problem that contact information or the like of the other party cannot automatically be managed/provided.

The technique of patent document 3 can be compared to the management, on a client terminal basis, which requires an indispensable management function of corresponding information between an IP address and a MAC address. This is achieved by adding a function of automatic registration/deletion, etc., of the seat to a DHCP (Dynamic Host Configuration Protocol) server. However, there arises a problem that, since the number of DHCP servers are enormous in the network of a company or the like, it is not practical to add the function to all the DHCP servers in terms of cost.

Further, in the technique of patent document 4, it is not possible to dynamically associate the telephone number of a destination (the other party) with the IP address thereof using the transmission/reception of e-mail as a trigger. Further, it has a problem that the other party's whereabouts (contact method) cannot be identified.

The present invention is made in light of what is described above, and it is a general object of this invention to provide a presence information management method and a presence information management system, both capable of automatically updating the presence information of the user concurrently with his/her e-mail transmission request.

In order to achieve this object, the present invention provides a presence information management method in which a terminal address and presence information correspondence table where the terminal address of a terminal and presence information including the positional information of the terminal are previously registered to correspond to each other, and an e-mail address and terminal address correspondence table where an e-mail address and a terminal address are registered to correspond to each other, are used to manage the presence information of the user having the e-mail address. The method comprises the steps of: extracting the e-mail address of the user and the terminal address of a terminal upon receipt of an e-mail transmission request; retrieving the e-mail address and terminal address correspondence table by using the extracted e-mail address; and registering the extracted terminal address in the e-mail address and terminal address correspondence table if the retrieved terminal address does not correspond to the extracted terminal address.

According to the presence information management method, it is possible to automatically update the presence information of the user concurrently with his/her e-mail transmission request.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Hereinafter, a description will be made about embodiments of the present invention based on the drawings.

<Configuration of Mail Server and Presence Server>

Figure 1:
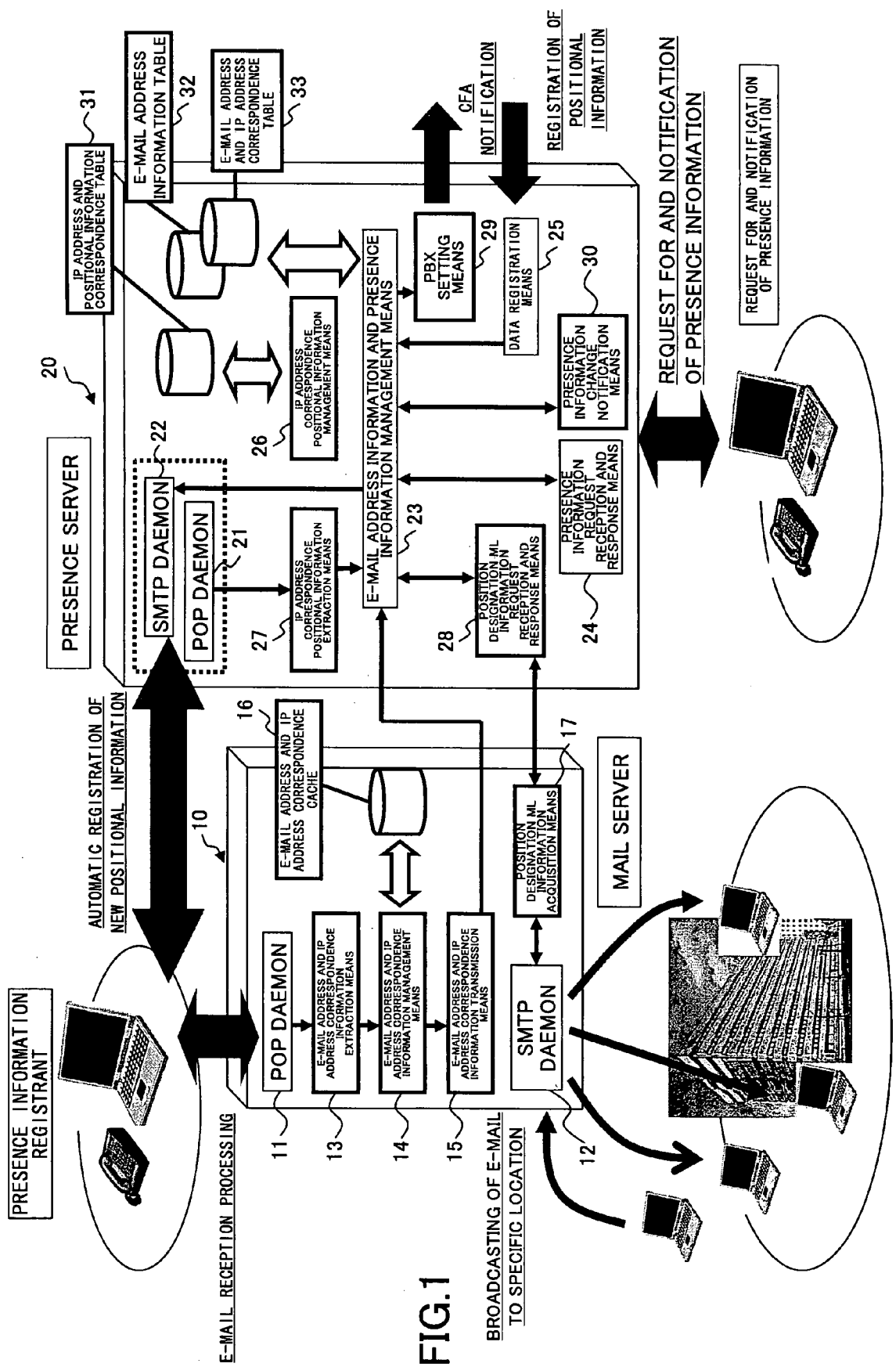
FIG. 1 is a block diagram of an embodiment of the system achieving a presence information management method of the present invention.

FIG. 1 shows a block diagram of an embodiment of the system achieving a presence information management method of the present invention. The system is employed in a company or the like, which has many bases and an has an in-company LAN established between the bases, and is composed of a mail server 10 to transmit/receive e-mail and a presence server 20 provided side by side with the mail server 10. Note that the mail server 10 and the presence server 20 may be configured to be integrated with each other.

The mail server 10 manages the transmission and reception of message data of an in-company LAN and includes in a conventional manner a POP (Post Office Protocol) daemon 11 which executes processing when a terminal downloads e-mail and a SMTP (Simple Mail Transfer Protocol) daemon 12 which executes processing when e-mail is transmitted from a terminal. Further, the mail server 10 is newly provided with the below-described means.

E-mail address and IP address correspondence information extraction means 13 extracts the e-mail address of the e-mail user who has issued a transmission request and the IP address of the terminal which has issued the transmission request when the transmission request is issued to the mail server 10 and notifies e-mail address and IP address correspondence information management means 14 of the e-mail address and the IP address thus extracted.

The e-mail address and IP address correspondence information management means 14 retrieves and registers the e-mail address and the IP address in an e-mail address and IP address correspondence cache 16. E-mail address and IP address correspondence information transmission means 15 notifies the presence server 20 of the corresponding status between the e-mail address and the IP address. The e-mail address and IP address correspondence cache 16 stores the corresponding table between the e-mail address and the IP address of the terminal from which an e-mail transmission request is issued and has the same structure as that of an e-mail address and IP address correspondence table 33.

Position designation mailing list information acquisition means 17 collects from the presence server 20 the information of e-mail users in a location to transmit e-mail to all the e-mail users in the specific location.

The presence server 20 collects and manages the presence information of employees, is provided side by side with the mail server 10, and includes in a conventional manner a POP daemon 21, a SMTP daemon 22, e-mail address information and presence information management means 23, presence information request reception and response means 24, and data registration means 25.

Further, the presence server 20 is newly provided with the below-described means. IP address correspondence positional information management means 26 retrieves and registers in an IP address and positional information correspondence table 31. IP address correspondence positional information extraction means 27 collects necessary information from the content of e-mail when the positional information corresponding to a newly added IP address is registered by e-mail.

Position designation mailing list information request reception and response means 28 returns the e-mail address information of the user in a specific location upon request from the mail server 10. PBX setting means 29 notifies a PBX (Private Branch Exchange) of a CFA (Call Forwarding All Call: telephone transfer function).

Presence information change notification means 30 sends notification of presence information when the presence information of the designated other party is updated.

The IP address and positional information correspondence table 31 is a table in which the IP address of a terminal and location information including the telephone number of the seat having the terminal and bases are previously registered to correspond to each another.

An e-mail address information table 32 is a table in which personal information (name, job title, or the like) of an e-mail address, a PBX transfer notification flag, and a presence information change notification flag are managed, and is referred to in order to acquire the information corresponding to an e-mail address when the presence server 20 is requested to provide information using name, job title, or the like as a retrieval key.

An e-mail address and IP address correspondence table 33 is a table in which an e-mail address and the IP address of the terminal from which an e-mail transmission request is issued are registered to correspond to each other and keeps an e-mail address, an initially registered IP address, a connection IP address, and the last update time of the connection IP address.

<General Operations of First Embodiment>

When an e-mail user having an e-mail address issues an e-mail transmission request to the POP daemon 11 of the mail server 10, the POP daemon 11 delivers the requested e-mail addressed to the e-mail user to the e-mail user and at the same time notifies the e-mail address and IP address correspondence information extraction means 13 of the e-mail transmission request from the e-mail user.

The e-mail address and IP address correspondence information extraction means 13 extracts the e-mail address and the IP address of the terminal of the e-mail user upon receipt of the notified information and notifies the e-mail address and IP address correspondence information management means 14 of the e-mail address and the IP address thus extracted.

The e-mail address and IP address correspondence information management means 14 refers to the e-mail address and IP address correspondence cache 16 and retrieves the IP address (hereinafter, "connection IP address" is simply referred to as "IP address") corresponding to the e-mail address. If the retrieved IP address does not correspond to the acquired IP address, the e-mail address and IP address correspondence information management means 14 recognizes that the presence information of the e-mail user has been changed and registers the acquired IP address in the connection IP address of the e-mail address and IP address correspondence cache 16.

After the registration of the IP address, the e-mail address and IP address correspondence information management means 14 notifies the e-mail address and IP address correspondence information transmission means 15 of the e-mail address and the IP address. The e-mail address and IP address correspondence information transmission means 15 notifies the e-mail address information and presence information management means 23 of the presence server 20 of the e-mail address and the IP address.

The e-mail address information and presence information management means 23 rewrites the IP address (connection IP address) corresponding to the notified e-mail address in the e-mail address and IP address correspondence table 33 with the notified IP address.

When the user requests the presence information of an e-mail user, the user notifies the presence server 20 of the name of the person whose presence information is desired. When the presence server 20 receives this at the presence information request reception and response means 24, it notifies the e-mail address information and presence information management means 23 of the requested name.

The e-mail address information and presence information management means 23 retrieves the e-mail address information table 32 and acquires the e-mail address by using the notified name. The e-mail address information and presence information management means 23 then retrieves the e-mail address and IP address correspondence table 33 and acquires the IP address. After the acquisition of the IP address, the e-mail address information and presence information management means 23 notifies the IP address correspondence positional information management means 26 of the IP address.

The IP address correspondence positional information management means 26 acquires the positional information corresponding to the notified IP address from the IP address and positional information correspondence table 31 and returns it to the e-mail address information and presence information management means 23. The acquired information is sent to the user requesting the presence information via the presence information request reception and response means 24.

<General Operations of Second Embodiment>

When an e-mail user notifies all the employees in a specific base W of information by e-mail, he/she transmits e-mail to the e-mail address of the mailing list designated to transmit to all the employees of base W.

The SMTP daemon 12 of the mail server 10 receives the e-mail and refers to the e-mail address. Based on the e-mail address, the SMTP daemon 12 notifies the position designation mailing list information acquisition means 17 that base W is the subject location of the mailing list. The position designation mailing list information acquisition means 17 requests the position designation mailing list information request reception and response means 28 of the presence server 20 to notify of the information of e-mail users of base W.

The position designation mailing list information request reception and response means 28 notifies the e-mail address information and presence information management means 23 of the positional information. When the e-mail address information and presence information management means 23 notifies the IP address correspondence positional information management means 26 of the acquired positional information, the IP address correspondence positional information management means 26 refers to the IP address and positional information correspondence table 31 and acquires a list of IP addresses present in base W. The e-mail address information and presence information management means 23 refers to the e-mail address and IP address correspondence table 33 with respect to the list of the IP addresses and acquires a list of the e-mail addresses corresponding to the IP addresses of the list of the IP addresses.

The list of the e-mail addresses is sent to the position designation mailing list information acquisition means 17 of the mail server 10 via the position designation mailing list information request reception and response means 28. An e-mail is transmitted from the SMTP daemon 12 to the e-mail addresses.

<General Operations of Third Embodiment>

When the user uses a CFA notification of a PBX, he/she notifies the presence server 20 of his/her e-mail address. The presence server 20 receives this at the PBX setting means 29 and notifies the e-mail address information and presence information management means 23 of the e-mail address.

The e-mail address information and presence information management means 23 retrieves the e-mail address information table 32 and turns on the PBX setting flag corresponding to the e-mail address. After completing the registration in the table, the presence server 20 notifies the user of the completion of the registration via the PBX setting means 29.

As described above, the user receives e-mail to thereby update his or her presence information, and the e-mail address information and presence information management means 23 of the presence server 20 retrieves the IP address corresponding to the e-mail address from the e-mail address and IP address correspondence table 33 and rewrites it with the notified IP address.

The e-mail address information and presence information management means 23 then refers to the e-mail address information table 32 and checks the PBX setting flag of the e-mail address whose presence information has been changed. If the PBX setting flag is turned on, the CFA notification of the PBX is necessary. Therefore, in order to acquire presence information (telephone number), the initially registered IP address and the changed connection IP address of the notified e-mail address in the e-mail address and IP address correspondence table 33 are sent to the IP address correspondence positional information management means 26.

The IP address correspondence positional information management means 26 retrieves the IP address and positional information correspondence table 31 and acquires the presence information (telephone numbers) corresponding to the initially registered IP address and the changed connection IP address and returns them to the e-mail address information and presence information management means 23.

The e-mail address information and presence information management means 23 notifies the PBX setting means 29 of the default telephone number (corresponding to the initially registered IP address) and the current telephone number (corresponding to the changed connection IP address) of the notified e-mail address. The PBX setting means 29 notifies the PBX of a CFA to change the initial telephone number to be the current telephone number, thereby completing the CFA notification processing.

<General Operations of Fourth Embodiment>

Let it be assumed that when a user makes a phone call to another user, the called user is absent, or that when the user requests the presence server 20 to provide the presence information 20 of another user, information is returned that the called user is absent. Upon receipt of the information that the called user is absent, the user requests the presence server 20 to notify him/her of updated information such as the called user's return to his/her seat or otherwise.

The presence information request reception and response means 24 of the presence server 20 receives this and notifies the e-mail address information and presence information management means 23 of the e-mail address of the absent user who is a notification subject, and notifies the presence information change notification means 30 of the information of the user as the source of request.

The e-mail address information and presence information management means 23 registers the presence information change notification flag corresponding to the e-mail address of the designated absent user and the e-mail address for which a change notification has been requested in the e-mail address and IP address correspondence table 33.

As described above, the absent user receives e-mail to thereby update his or her presence information, and the e-mail address information and presence information management means 23 of the presence server 20 retrieves the IP address corresponding to the e-mail address from the e-mail address and IP address correspondence table 33 and rewrites it with the notified IP address.

The e-mail address information and presence information management means 23 then refers to the e-mail address information table 32 and checks the presence information change notification flag of the e-mail address whose presence information has been changed. When the flag is set, it is necessary to report the change of the presence information to the e-mail address which has requested for a change notification. Therefore, the IP address which has been changed is first reported to the IP address correspondence positional information management means 26 to acquire the presence information.

The IP address correspondence positional information management means 26 retrieves the IP address and positional information correspondence table 31, acquires the presence information corresponding to the notified IP address, and returns it to the e-mail address information and presence information management means 23. The e-mail address information and presence information management means 23 notifies the presence information change notification means 30 of the e-mail address and the changed presence information. The presence information change notification means 30 notifies the user, who is the source of request, of the updated presence information of the absent user, thereby completing the presence information notification process.

<General Operations of Fifth Embodiment>

As described above, the user receives e-mail to thereby update his or her presence information, and the e-mail address information and presence information management means 23 of the presence server 20 retrieves the IP address corresponding to the e-mail address from the e-mail address and IP address correspondence table 33 and rewrites it with the notified IP address.

Now, when the user receives e-mail at the terminal to which a new IP address is allocated, the e-mail address information and presence information management means 23 notifies the IP address correspondence positional information management means 26 of the changed IP address to acquire presence information (telephone number) along with the change of the IP address.

The IP address correspondence positional information management means 26 retrieves the IP address and positional information correspondence table 31 by using the notified IP address and acquires the corresponding presence information (telephone number). However, if the notified IP address is not present in the IP address and positional information correspondence table 31, the IP address correspondence positional information management means 26 notifies the e-mail address information and presence information management means 23 that the IP address is not present in the IP address and positional information correspondence table 31.

To collect the positional information on the IP address not present in the table, the e-mail address information and presence information management means 23 notifies the SMTP daemon 22 to transmit e-mail requesting the positional information to the e-mail address of the user so that the e-mail is transmitted to the user who has issued the e-mail transmission request with the IP address.

The user having received the e-mail from the presence server 20 enters the positional information about the IP address, which has received the transmission, on e-mail in a given format and transmits the entered e-mail to the presence server 20.

The POP daemon 21 of the presence server 20 receives this and transmits the content of the received e-mail to the IP address correspondence positional information extraction means 27. The IP address correspondence positional information extraction means 27 extracts the positional information from the content of the e-mail and notifies the data registration means 25 of the positional information together with the IP address.

The data registration means 25 notifies the e-mail address information and presence information management means 23 of the positional information corresponding to the IP address, and the e-mail address information and presence information management means 23 notifies the IP address correspondence positional information management means 26 of the positional information to be registered in the IP address and positional information correspondence table 31. The IP address correspondence positional information management means 26 registers the positional information corresponding to the IP address in the IP address and positional information correspondence table 31 and returns a notification of the completion of the registration.

First Embodiment

A description will more specifically be made about an embodiment of the presence information management method of the present invention. Note that a request for and a response to presence information between the user and the presence server 20 will be made by e-mail. Examples of communication interfaces between the user and the presence server 20 include a Web browser and LDAP (Lightweight Directory Access Protocol).

Figure 2:
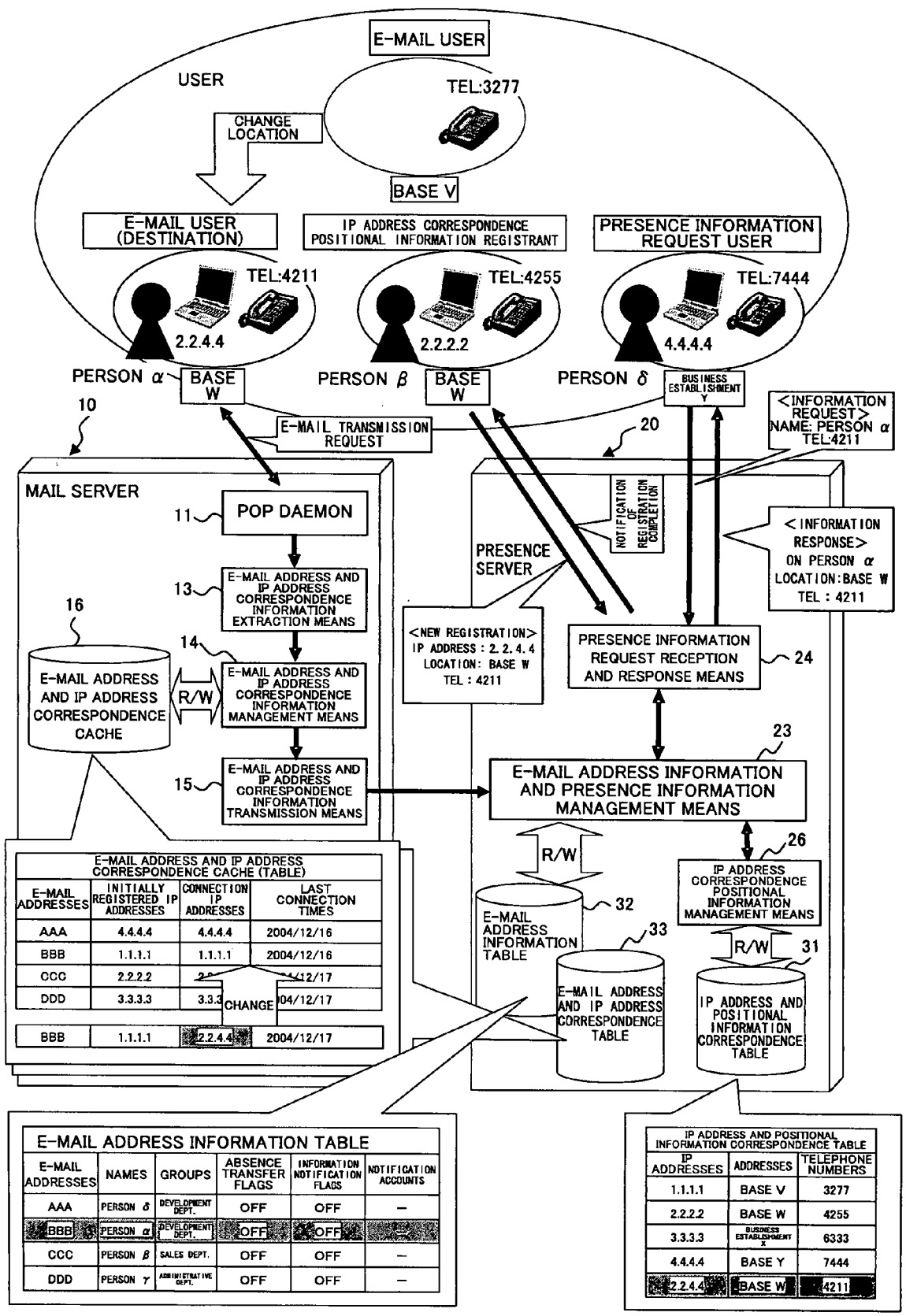
FIG. 2 is a diagram showing the network configuration of a first embodiment of the system achieving the method of the present invention.
Figure 3:
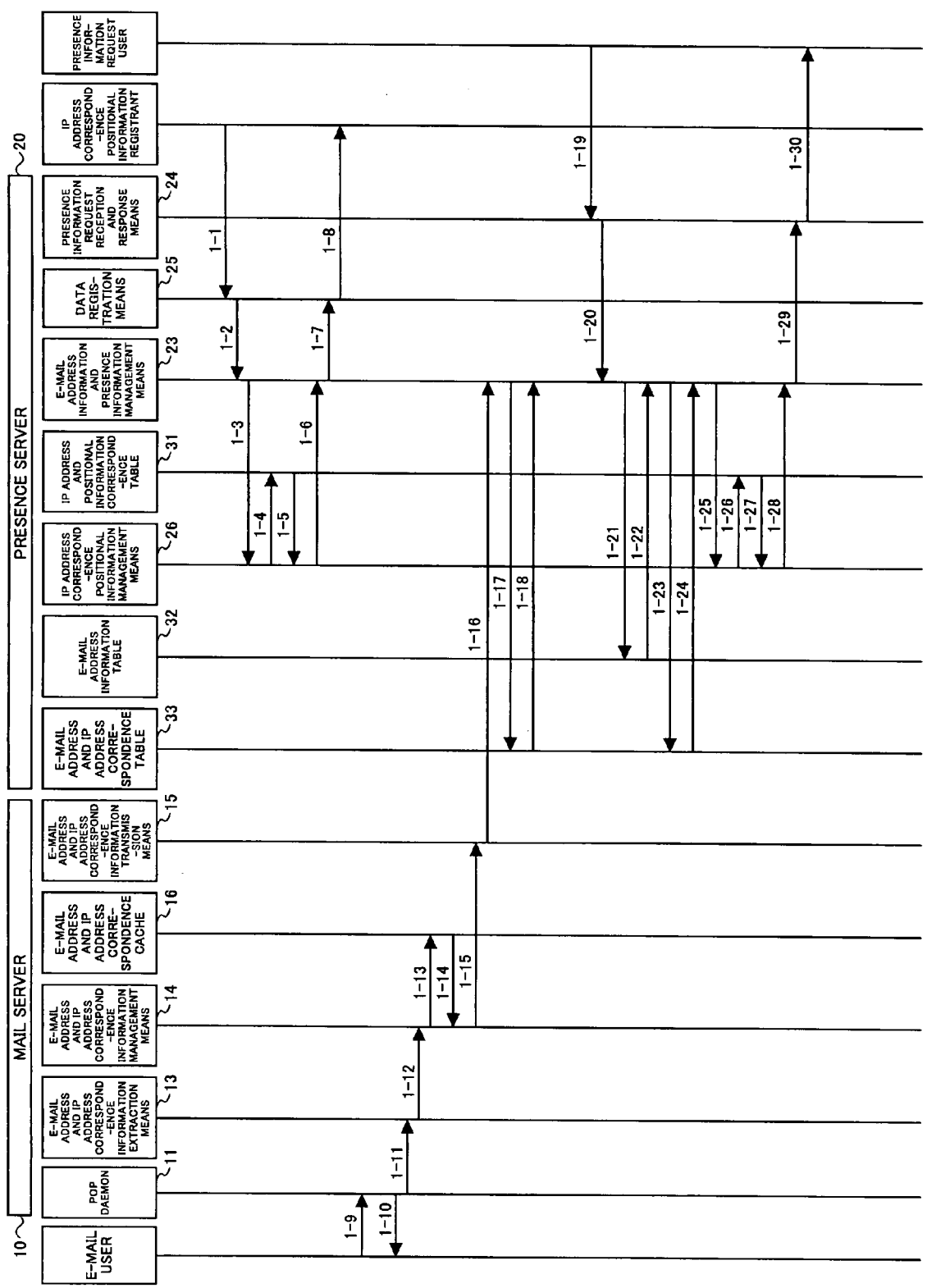
FIG. 3 is the operations sequence of the first embodiment of the system achieving the method of the present invention.

FIG. 2 shows the network configuration of the first embodiment of the system achieving the method of the present invention, and FIG. 3 shows the operations sequence of the first embodiment of the system achieving the method of the present invention.

In FIG. 2, an e-mail user is connected to a network through which the mail server 10 and the presence server 20 are available. The mail server 10 includes the POP daemon 11, the e-mail address and IP address correspondence information extraction means 13, the e-mail address and IP address correspondence information management means 14, the e-mail address and IP address correspondence information transmission means 15, and the e-mail address and IP address correspondence cache 16. The mail server 10 transmits and receives e-mail to and from the e-mail user through communications using the network. Further, the mail server 10 transfers presence information to and from the presence server 20. Here, presence information shall be transferred by the use of LDAP.

The presence server 20 includes the e-mail address information and presence information management means 23, the presence information request reception and response means 24, the IP address correspondence positional information management means 26, the e-mail address information table 32, the e-mail address and IP address correspondence table 33, and the IP address and positional information correspondence table 31. The presence server 20 transfers information to and from the user requesting presence information by e-mail.

<Static Registration of Positional Information on New IP Address>

When manager β of the presence server 20 registers an IP address and corresponding positional information (location: base W, telephone number: 4211) in the presence server 20 with respect to a newly added IP address "2.2.4.4," he/she requests the data registration means 25 (as shown in FIG. 3) of the presence server 20 to register them (step 1-1 of FIG. 3).

The data registration means 25 of the presence server 20 notifies the e-mail address information and presence information management means 23 of the notified IP address and the positional information (step 1-2). Upon receipt of this notification, the e-mail address information and presence information management means 23 requests the IP address correspondence positional information management means 26 to register the IP address and the positional information (step 1-3).

The IP address correspondence positional information management means 26 registers the IP address and the corresponding positional information in the IP address and positional information correspondence table 31 (steps 1-4 and 1-5). After completing the registration of the information, the data registration means 25 notifies manager β of the completion of the registration via the e-mail address information and presence information management means 23 (steps 1-6 through 1-8).

<Registration of Presence Information>

When person α, who has made a business trip from base V and used the terminal of the seat having the IP address "2.2.4.4" of base W, issues an e-mail transmission request for his or her e-mail address BBB@mail.fujitsu.com to the mail server 10 (step 1-9), the POP daemon 11 of the mail server 10 transmits the e-mail addressed to BBB@mail.fujitsu.com to person α (step 1-10).

After the transmission of the e-mail, the POP daemon 11 notifies the e-mail address and IP address correspondence information extraction means 13 of the transmission request from person α to manage the positional information of person α (step 1-11). The e-mail address and IP address correspondence information extraction means 13 extracts the e-mail address of person a BBB@mail.fujitsu.com and the IP address "2.2.4.4" upon receipt of the e-mail transmission request and requests the e-mail address and IP address correspondence information management means 14 to execute processing (step 1-12).

The e-mail address and IP address correspondence information management means 14 retrieves the notified e-mail address BBB@mail.fujitsu.com from the e-mail address and IP address correspondence cache 16 (step 1-13) and extracts the IP address corresponding to the e-mail address BBB@mail.fujitsu.com and the last update time that the IP address was updated.

If the extracted IP address does not correspond to the notified IP address, the notified IP address will be set in the e-mail address and IP address correspondence cache 16. Here, since the notified IP address is "2.2.4.4," which differs from the IP address of the cache, the IP address "2.2.4.4" is registered and the last update time is updated (step 1-14). After the setting is completed, the e-mail address and IP address correspondence information management means 14 requests the e-mail address and IP address correspondence information transmission means 15 to execute processing using the e-mail address, the IP address, and the update time as a parameter so that information on e-mail address management of the presence server 20 is changed and completes the processing (step 1-15).

The e-mail address and IP address correspondence information transmission means 15 requests the e-mail address information and presence information management means 23 to set the IP address corresponding to the e-mail address BBB@mail.fujitsu.com using the notified e-mail address, the IP address, and the update time as a parameter and completes the processing (step 1-16).

The e-mail address information and presence information management means 23 retrieves the e-mail address and IP address correspondence table 33 by using the notified e-mail address (step 1-17) and rewrites the IP address corresponding to the notified e-mail address (step 1-18).

<Request for Presence Information>

Now, person δ who wants to get the presence information of person α makes a request to the presence information request reception and response means 24 of the presence server 20 to collect the presence information of person α (step 1-19).

The presence information request reception and response means 24 notifies the e-mail address information and presence information management means 23 of the information on the requested name (person α) (step 1-20). The e-mail address information and presence information management means 23 retrieves the corresponding e-mail address from the e-mail address information table 32 by using the notified name (steps 1-21 and 1-22).

Here, the e-mail address of person α BBB@mail.fujitsu.com is acquired. The e-mail address information and presence information management means 23 then retrieves the corresponding IP address "2.2.4.4" from the e-mail address and IP address correspondence table 33 by using the retrieved e-mail address BBB@mail.fujitsu.com (steps 1-23 and 1-24).

The e-mail address information and presence information management means 23 notifies the IP address correspondence positional information management means 26 of the retrieved IP address (step 1-25), and the IP address correspondence positional information management means 26 retrieves the IP address and positional information correspondence table 31 (step 1-26) and acquires the presence information (location: base W, telephone number: 4211) on the IP address based on the notified IP address (steps 1-27 and 1-28).

The e-mail address information and presence information management means 23 notifies the presence information request reception and response means 24 of the acquired presence information (step 1-29). The presence information request reception and response means 24 transmits e-mail, in which the presence information of person a is described, to person δ (step 1-30). Accordingly, processing for a request for the presence information is completed, which in turn makes it possible for person δ to acquire the information of person α.

According to the present embodiment, it is possible to automatically update the presence information of the user when an e-mail transmission request is issued.

Second Embodiment

Figure 4:
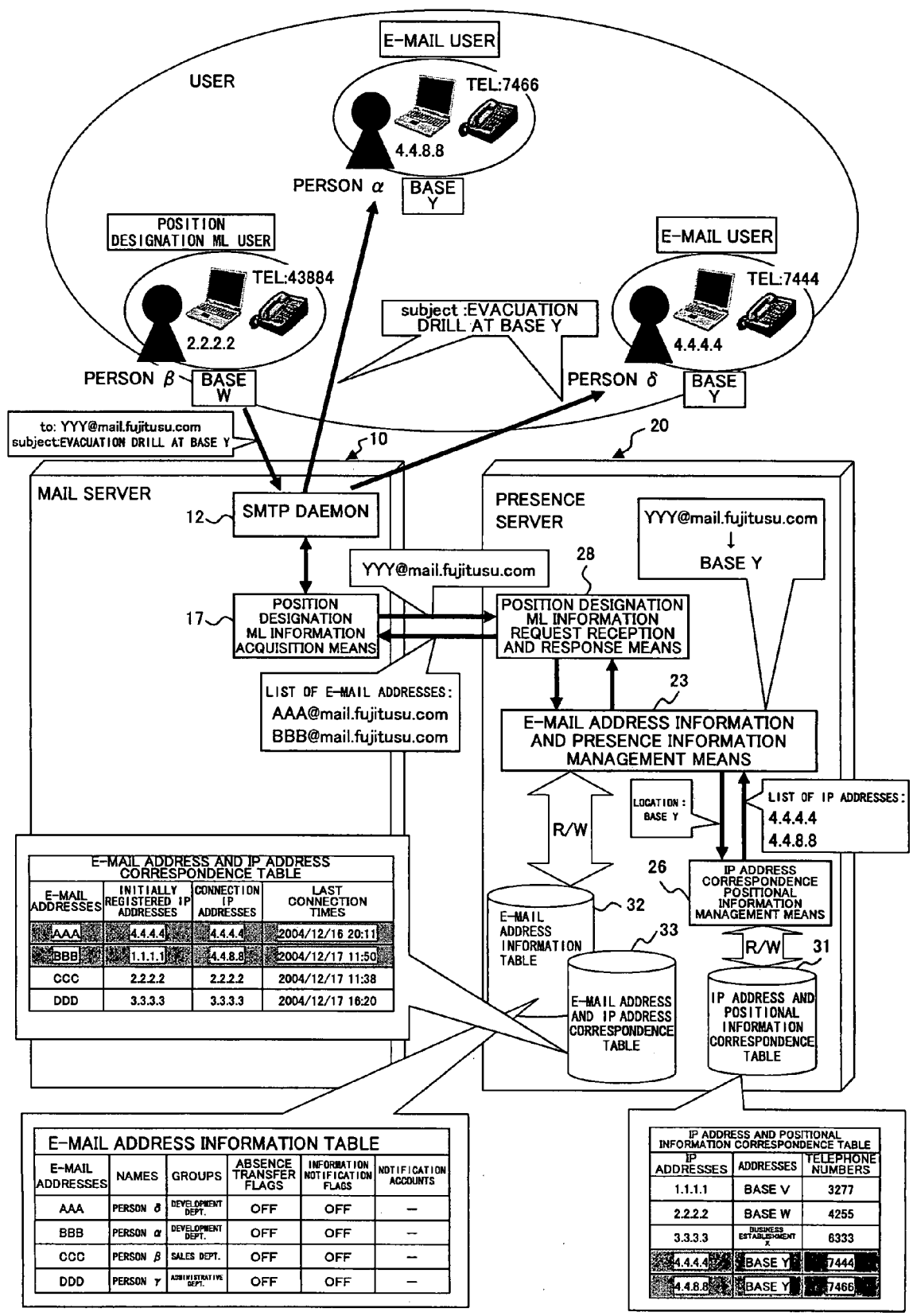
FIG. 4 is a diagram showing the network configuration of a second embodiment of the system achieving the method of the present invention.
Figure 5:
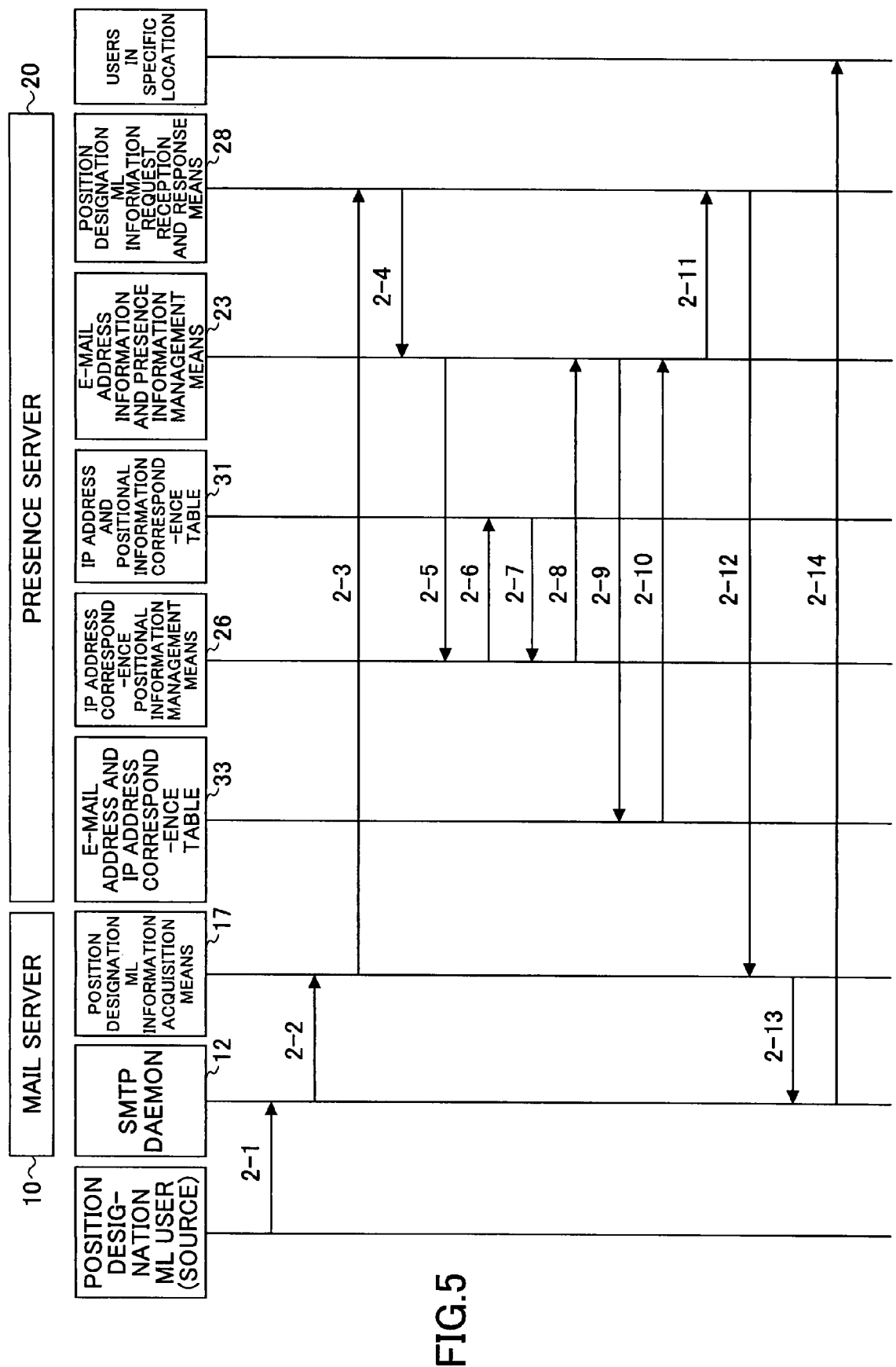
FIG. 5 is the operations sequence of the second embodiment of the system achieving the method of the present invention.

FIG. 4 shows the network configuration of the second embodiment of the system achieving the method of the present invention, and FIG. 5 shows the operations sequence of the second embodiment of the system achieving the method of the present invention.

In FIG. 4, an e-mail user is connected to a network through which the mail server 10 and the presence server 20 are available. The mail server 10 includes the SMTP daemon 12 and the position designation mailing list information acquisition means 17. The mail server 10 transmits and receives e-mail to and from the e-mail user through communications using the network. Further, the mail server 10 transfers presence information to and from the presence server 20. Here, presence information shall be transferred by the use of LDAP.

The presence server 20 includes the e-mail address information and presence information management means 23, the IP address correspondence positional information management means 26, the position designation mailing list information request reception and response means 28, the IP address and positional information correspondence table 31, the e-mail address information table 32, and the e-mail address and IP address correspondence table 33. The presence server 20 transfers information to and from the user requesting presence information by e-mail.

<Transmission of e-Mail to Specific Location>

When person β wants to transmit e-mail to all the e-mail users of base Y, he/she transmits the e-mail to the designated e-mail address "YYY@mail.fujitsu.com" of the mailing list (hereinafter abbreviated as "ML") of base Y (an e-mail transmission request with a position designation mailing list: step 2-1 of FIG. 5).

The requested e-mail is received by the SMTP daemon 12 of the mail server 10. The SMTP daemon 12, which has received the e-mail, determines whether the requested e-mail address refers to the mailing list of a specific location. Here, since the e-mail address refers to the ML of base Y, the SMTP daemon 12 collects the e-mail addresses of all the e-mail users of base Y.

To collect the e-mail addresses, the SMTP daemon 12 requests the position designation mailing list information acquisition means 17 to execute processing using the ML information (the e-mail address of the mailing list "YYY@mail.fujitsu.com") of base Y as a parameter and waits for a response (step 2-2). In case that the requested e-mail address does not refer to the ML of a specific location, e-mail is delivered to e-mail addresses under the control in the same manner as a usual ML.

Upon receipt of the processing request, the position designation mailing list information acquisition means 17 notifies the position designation mailing list information request reception and response means 28 of the processing request to request position designation ML information based on the parameter for the position designation ML information and waits for a response (step 2-3).

When the position designation mailing list information request reception and response means 28 receives the request for position designation ML information from the position designation mailing list information acquisition means 17, it requests the e-mail address information and presence information management means 23 to execute processing using the position designation ML information as a parameter to collect a list of the e-mail addresses to which e-mail is to be transmitted and waits for a response (step 2-4).

The e-mail address information and presence information management means 23 determines based on the received position designation ML information whether the transmission of e-mail is intended for a specific location. If the result shows that it targets on the location, the e-mail address information and presence information management means 23 notifies the IP address correspondence positional information management means 26 to extract a list of IP addresses using the address of the specific location as a parameter and waits for a response (step 2-5). Here, the e-mail address information and presence information management means 23 notifies the IP address correspondence positional information management means 26 to extract a list of IP addresses on base Y.

The IP address correspondence positional information management means 26 retrieves the IP address and positional information correspondence table 31 on base Y and extracts all the corresponding IP addresses (steps 2-6 and 2-7). Here, the IP addresses "4.4.4.4" and "4.4.8.8" are extracted.

The response to the extraction of a list of IP addresses is returned to the e-mail address information and presence information management means 23 using the list of the IP addresses as a parameter (step 2-8). The e-mail address information and presence information management means 23, which has been notified of the response to the extraction of a list of IP addresses, retrieves the e-mail address and IP address correspondence table 33 by using the IP addresses and extracts the e-mail addresses corresponding to the IP addresses "4.4.4.4" and "4.4.8.8" (steps 2-9 and 2-10).

As a response to the request for position designation ML information, the e-mail address information and presence information management means 23 notifies the position designation mailing list information request reception and response means 28 of the extracted e-mail addresses "AAA@mail.fujitsu.com" and "BBB@mail.fujitsu.com" as a parameter (step 2-11).

The position designation mailing list information request reception and response means 28 edits the list of the notified e-mail addresses as a list of e-mail addresses under the control of the position designation ML. The position designation mailing list information request reception and response means 28 sets the edited list of the e-mail addresses as a response parameter, notifies the position designation mailing list information acquisition means 17 of the mail server 10 of the response for position designation ML information, and completes the processing (step 2-12).

The position designation mailing list information acquisition means 17, which has been notified of the response, notifies the SMTP daemon 12 of the notified list of the e-mail addresses and completes the processing (step 2-13).

The SMTP daemon 12, which has been notified of the list of the e-mail addresses, transmits e-mail to the e-mail addresses AAA@mail.fujitsu.com and BBB@mail.fujitsu.com and completes the processing (step 2-14). As a result, the e-mail will be transmitted to persons 6 and a of base Y.

According to the present embodiment, it is possible to transmit e-mail only to persons in a specific location having the presence server 20 and the mail server 20 and reliably transmit information on the specific location to the persons involved. At the same time, e-mail will not be transmitted to the persons not present in the location in question, thereby making it also possible to reduce the load of a network.

Third Embodiment

Figure 6:
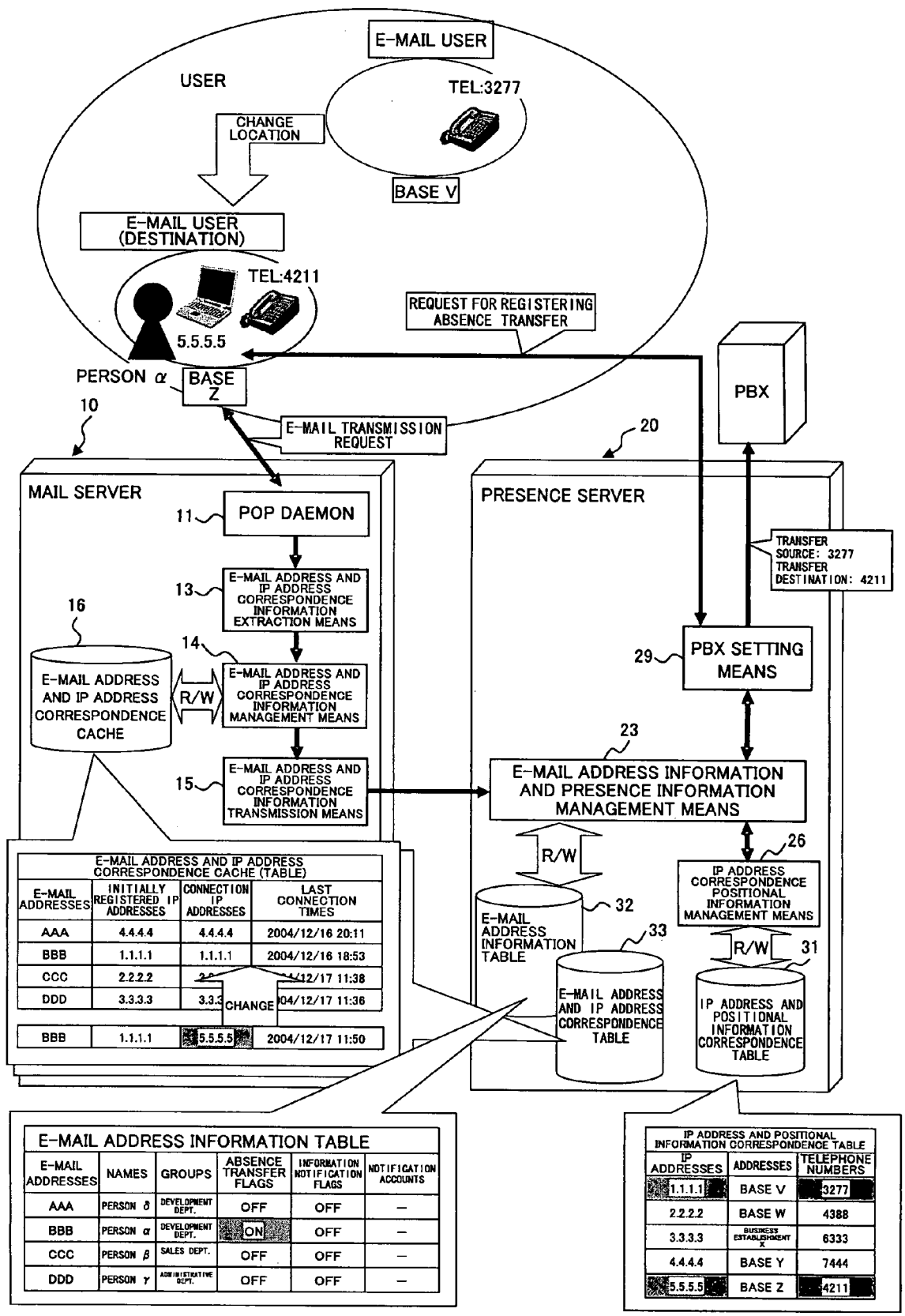
FIG. 6 is a diagram showing the network configuration of a third embodiment of the system achieving the method of the present invention.
Figure 7:
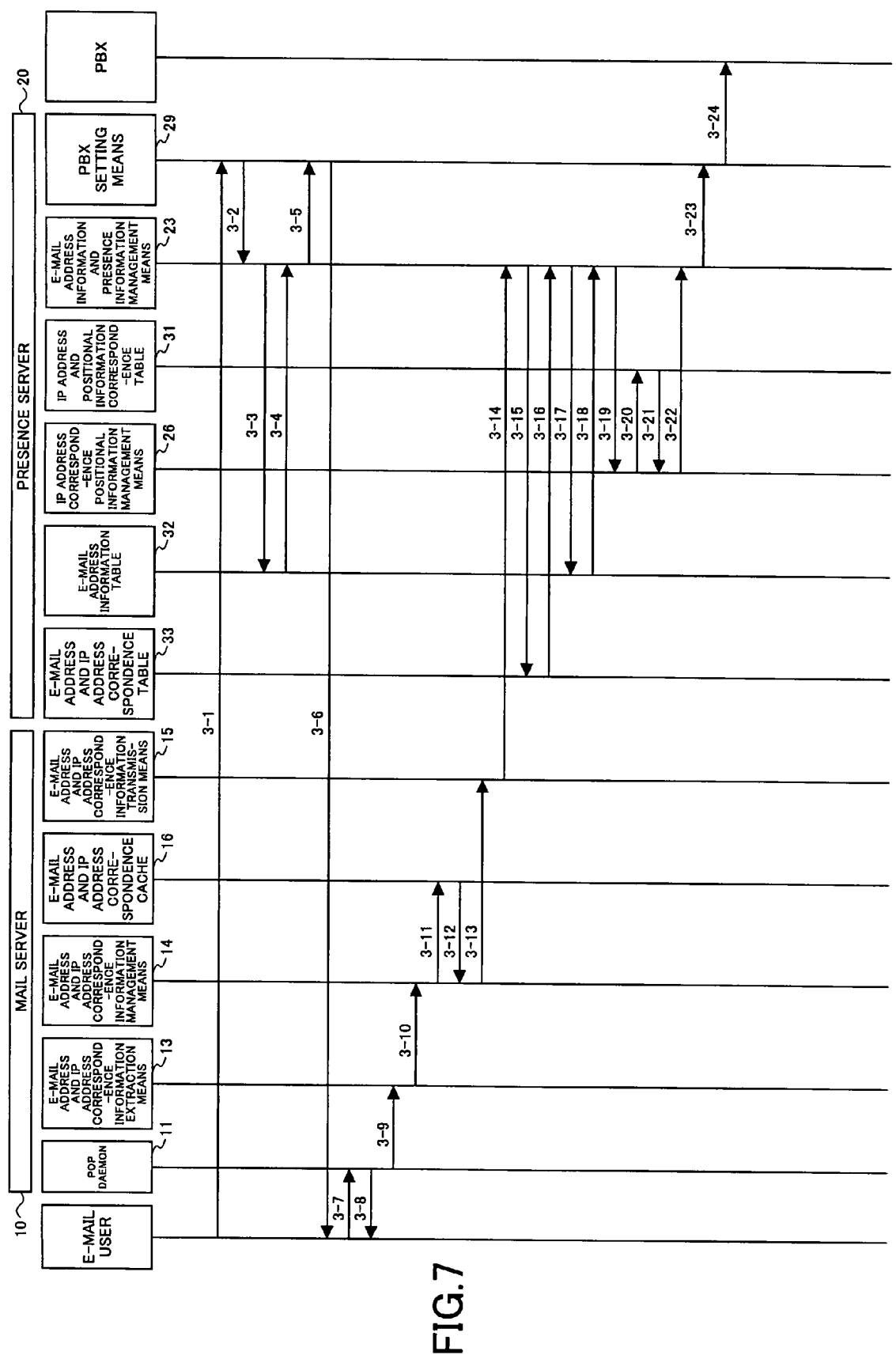
FIG. 7 is the operations sequence of the third embodiment of the system achieving the method of the present invention.

FIG. 6 shows the network configuration of the third embodiment of the system achieving the method of the present invention, and FIG. 7 shows the operations sequence of the third embodiment of the system achieving the method of the present invention.

In FIG. 6, an e-mail user is connected to a network through which the mail server 10 and the presence server 20 are available. The mail server 10 includes the POP daemon 11, the e-mail address and IP address correspondence information extraction means 13, the e-mail address and IP address correspondence information management means 14, the e-mail address and IP address correspondence information transmission means 15, and the e-mail address and IP address correspondence cache 16. The mail server 10 transmits and receives e-mail to and from the e-mail user through communications using the network. Further, the mail server 10 transfers presence information to and from the presence server 20. Here, presence information shall be transferred by the use of LDAP.

The presence server 20 includes the e-mail address information and presence information management means 23, the IP address correspondence positional information management means 26, the IP address and positional information correspondence table 31, the e-mail address information table 32, and the e-mail address and IP address correspondence table 33. The presence server 20 transfers information to and from the user requesting presence information by e-mail.

<Request for Registering Absence Transfer>

When person α wants to manage presence by the use of absence transfer of the PBX, he/she notifies the PBX setting means 29 of the presence server 20 of his/her e-mail address BBB@mail.fujitsu.com (step 3-1 of FIG. 7).

Having the notified e-mail address set as a parameter, the PBX setting means 29 notifies the e-mail address information and presence information management means 23 of the absence transfer of the PBX and waits for a response (step 3-2).

Upon notification of the absence transfer request of the PBX, the e-mail address information and presence information management means 23 retrieves the e-mail address information table 32 by using the notified e-mail address and requests for personal information (step 3-3). The e-mail address information and presence information management means 23 sets the absence transfer function valid flag of the requested personal information to be turned on.

Here, the flag corresponding to person α is set (step 3-4). After the setting is completed, the e-mail address information and presence information management means 23 notifies the PBX setting means 29 of the completion of the absence transfer setting, which means that the processing has been completed, and completes the processing (step 3-5). The PBX setting means 29, which has been notified of the completion of the absence transfer, notifies person α of the completion of the absence transfer setting and completes the processing (step 3-6).

<Registration of Presence Information>

Now, person α changes his/her location from base V to base Z to thereby change the presence information. As <Registration of Presence Information> is performed in the same manner as the first embodiment, it will be omitted (steps 3-7 through 3-16). Accordingly, the IP address "5.5.5.5" corresponding to the e-mail address of person α is registered in the e-mail address and IP address correspondence table 33 of the presence server 20.

After the e-mail address and IP address correspondence table 33 is updated, the e-mail address information and presence information management means 23 retrieves the e-mail address information table 32 by using the e-mail address (step 3-17) and extracts personal information (name, group, PBX absence transfer function validity flag, information notification flag for the case of location change, e-mail address to which presence information is informed) (step 3-18).

Now, since the PBX absence transfer function validity flag corresponding to the e-mail address BBB@mail.fujitsu.com is turned on, the e-mail address information and presence information management means 23 requests the IP address correspondence positional information management means 26 to extract the personal information using the IP address before the change and the IP address after the change (i.e., the initially registered IP address and the changed connection IP address of the notification e-mail address in the e-mail address and IP address correspondence table 33) as a parameter to extract the telephone number allocated to the IP address and waits for a response (step 3-19).

The IP address correspondence positional information management means 26, which has been requested to extract the personal information, retrieves the IP address and positional information correspondence table 31 by using the IP address before the change and the IP address after the change as a parameter (step 3-20), extracts the positional information before the change (address and telephone number) and the positional information after the change (address and telephone number) (step 3-21), notifies the e-mail address information and presence information management means 23 of the addresses thus extracted, and completes the processing (step 3-22).

<Registration of Absence Transfer>

The e-mail address information and presence information management means 23, which has been notified of the personal information before the change (address and telephone number) and the personal information after the change (address and telephone number), notifies the PBX setting means 29 of the absence transfer request of the PBX using the telephone number (personal information) before the change and the telephone number (personal information) after the change as a parameter and completes the processing (step 3-23).

The PBX setting means 29, which has been notified of the absence transfer request of the PBX, generates a remote command for the notified telephone number before the change to be absence-transferred to the telephone number after the change and requests the PBX to register the absence transfer. At this time, if the telephone number before the change corresponds to the telephone number after the change, the PBX setting means 29 has the PBX cancel the absence transfer (step 3-24).

According to the present embodiment, a phone call made to the telephone number of the other party will automatically be transferred to the telephone on the desk of the other party. Therefore, it is not necessary to request information from the presence server 20 in making a phone call to the other party and makes it possible to immediately contact the other party.

Fourth Embodiment

Figure 8:
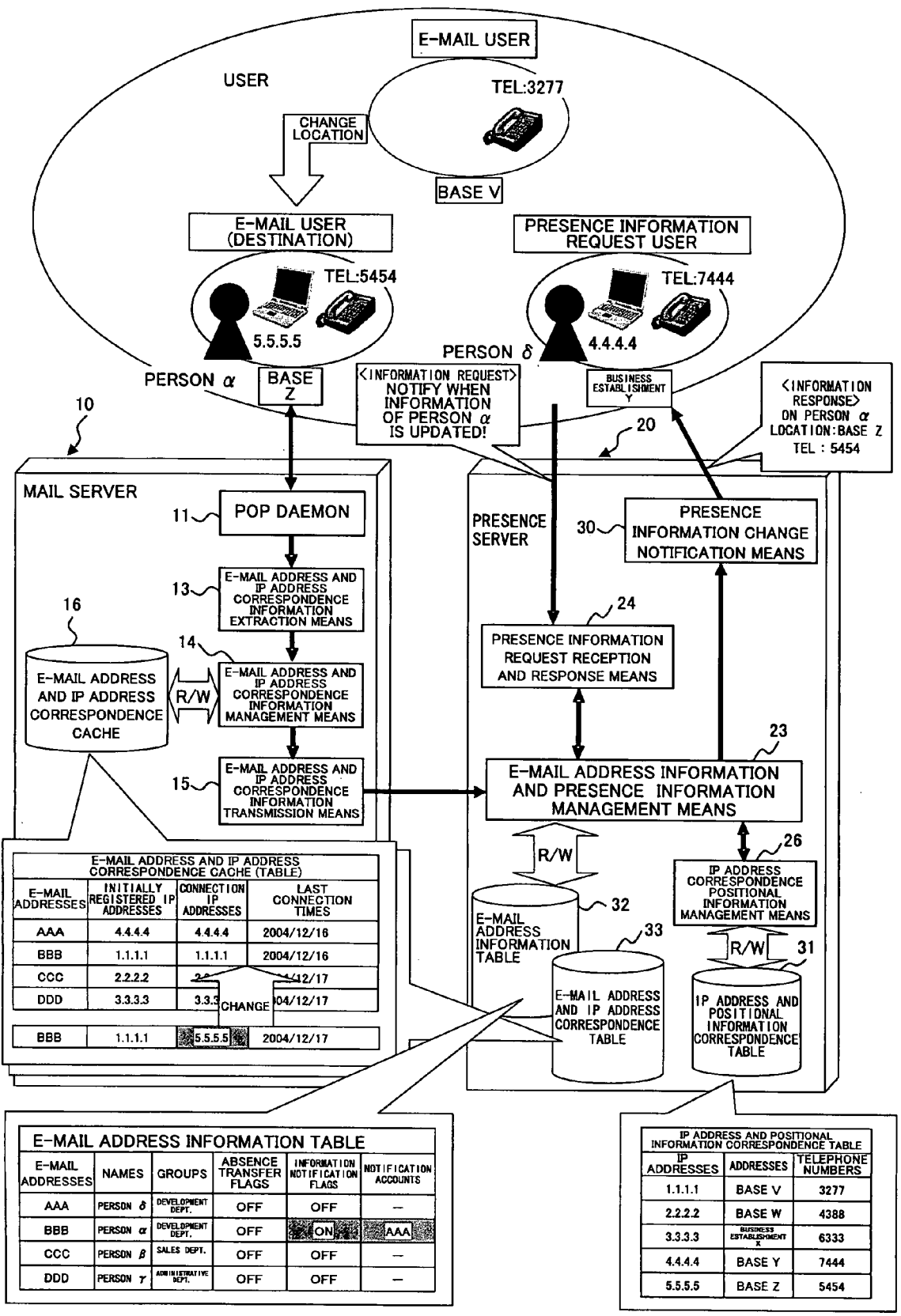
FIG. 8 is a diagram showing the network configuration of a fourth embodiment of the system achieving the method of the present invention.
Figure 9:
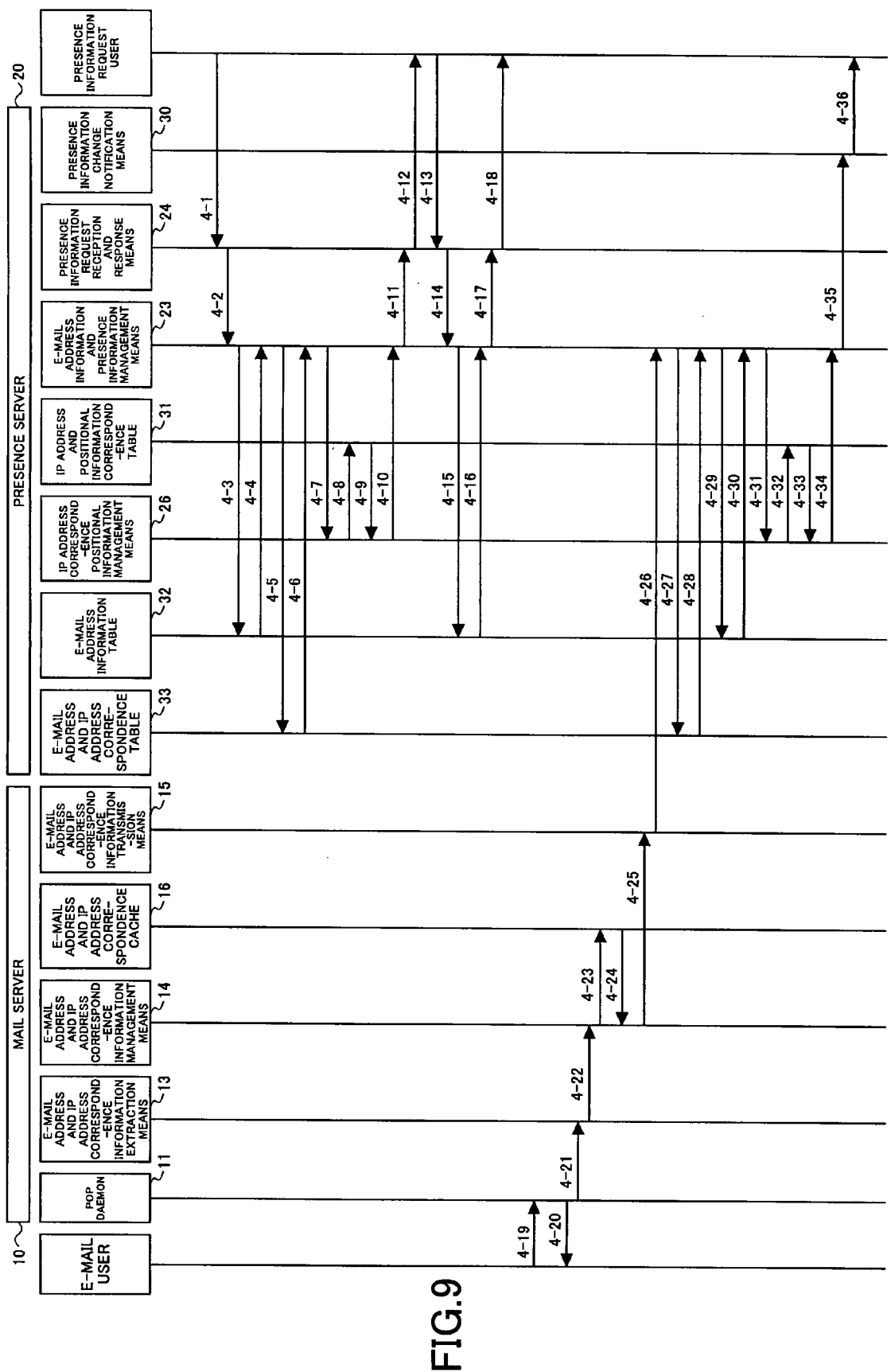
FIG. 9 is the operations sequence of the fourth embodiment of the system achieving the method of the present invention.

FIG. 8 shows the network configuration of the fourth embodiment of the system achieving the method of the present invention, and FIG. 9 shows the operations sequence of the fourth embodiment of the system achieving the method of the present invention.

In FIG. 8, an e-mail user is connected to a network through which the mail server 10 and the presence server 20 are available. The mail server 10 includes the POP daemon 11, the e-mail address and IP address correspondence information extraction means 13, the e-mail address and IP address correspondence information management means 14, the e-mail address and IP address correspondence information transmission means 15, and the e-mail address and IP address correspondence cache 16. The mail server 10 transmits and receives e-mail to and from the e-mail user through communications using the network. Further, the mail server 10 transfers presence information to and from the presence server 20. Here, presence information shall be transferred by the use of LDAP.

The presence server 20 includes the e-mail address information and presence information management means 23, the presence information request reception and response means 24, the IP address correspondence positional information management means 26, the IP address and positional information correspondence table 31, the e-mail address information table 32, and the e-mail address and IP address correspondence table 33. The presence server 20 transfers information to and from the user requesting presence information by e-mail.

<Request for Presence Information>

When person δ wants to collect the presence information of person α to know his/her presence information, he/she makes a request to the presence server 20. As the processing of the presence server 20 is performed in the same manner as <Request for Presence Information> of the first embodiment, description of it will be omitted (steps 4-1 through 4-12 of FIG. 9).

Now, let it be assumed that, after looking at the presence information of person α acquired from the presence server 20, person δ determines that "person α changes his/her location and is not in there" due to the fact that a long time has passed since the last update time of person a's IP address. The person δ makes a request to the presence server 20 for notification when the presence information of person α is updated (step 4-13).

Upon receipt of this, the presence information request reception and response means 24 of the presence server 20 notifies the e-mail address information and presence information management means 23 that the subject of the information to be requested is person α and the source of request for the information is person 6 (step 4-14).

The e-mail address information and presence information management means 23 retrieves the e-mail addresses of both persons from the e-mail address information table 32 and turns on an information notification flag for the case of location change corresponding to the subject of the information. Here, the information notification flag for the case of location change on person α is turned on, and the e-mail address of person δ AAA@mail.fujitsu.com is registered as the e-mail address to which presence information is reported (steps 4-15 and 4-16).

After completing the registration, the e-mail address information and presence information management means 23 notifies person δ of the completion of receiving the request via the presence information request reception and response means 24 (steps 4-17 and 4-18).

<Registration of Presence Information>

Now, person α changes his/her location from base V to base Z to thereby change the presence information. As the registration of presence information is performed in the same manner as the first embodiment, it will be omitted (steps 4-19 through 4-28).

The IP address "5.5.5.5" corresponding to the e-mail address of person α BBB@mail.fujitsu.com is registered in the e-mail address and IP address correspondence table 33 of the presence server 20.

After the e-mail address and IP address correspondence table 33 is updated, the e-mail address information and presence information management means 23 retrieves the e-mail address information table 32 by using the e-mail address (step 4-29) and extracts personal information (name, group, PBX absence transfer function validity flag, information notification flag for the case of location change, e-mail address to which presence information is reported) (step 4-30).

Now, the information notification flag for the case of location change corresponding to the e-mail address BBB@mail.fujitsu.com is turned on, and the e-mail address AAA@mail.fujitsu.com is registered as the e-mail address to which the presence information is informed. Therefore, the e-mail address information and presence information management means 23 requests the IP address correspondence positional information management means 26 to extract the personal information using the updated IP address as a parameter to extract the positional information allocated to the IP address and waits for a response (step 4-31).

The IP address correspondence positional information management means 26, which has been requested to extract the personal information, retrieves the notified IP address from the IP address and positional information correspondence table 31 (step 4-32) and extracts the positional information (step 4-33). The IP address correspondence positional information management means 26 notifies the e-mail address information and presence information management means 23 of the positional information thus extracted (step 4-34).

<Notification of Presence Information Change>

The e-mail address information and presence information management means 23 notifies the presence information change notification means 30 of the presence information of person α and the e-mail address AAA@mail.fujitsu.com of person δ who has requested for the person a's information (step 4-35).

The presence information change notification means 30 informs the person a's information to the e-mail address AAA@mail.fujitsu.com to thereby allow person δ to receive the presence information of person α along with the change of the presence information (step 4-36).

According to the present embodiment, in a case where someone makes a phone call to the other party to contact but he/she is not available for the call, for example, if the someone requests the presence server 20 to report his/her return to his/her desk, when the presence server 20 collects the destination information of the other party, the information will be reported to the source of request. Accordingly, it is possible for the someone to make a phone call to the other party without the crossing of phone calls or the like.

Fifth Embodiment

Figure 10:
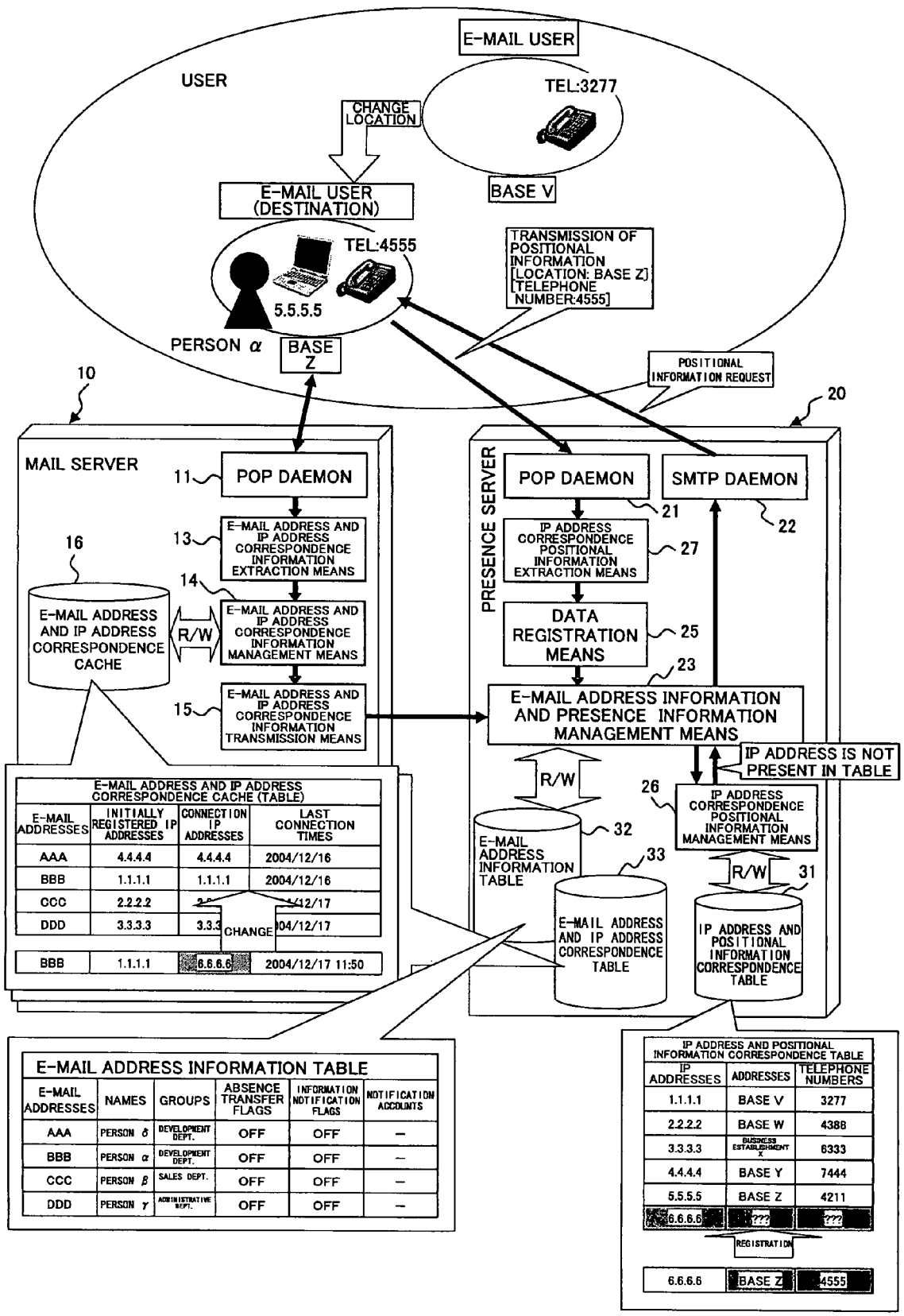
FIG. 10 is a diagram showing the network configuration of a fifth embodiment of the system achieving the method of the present invention.
Figure 11:
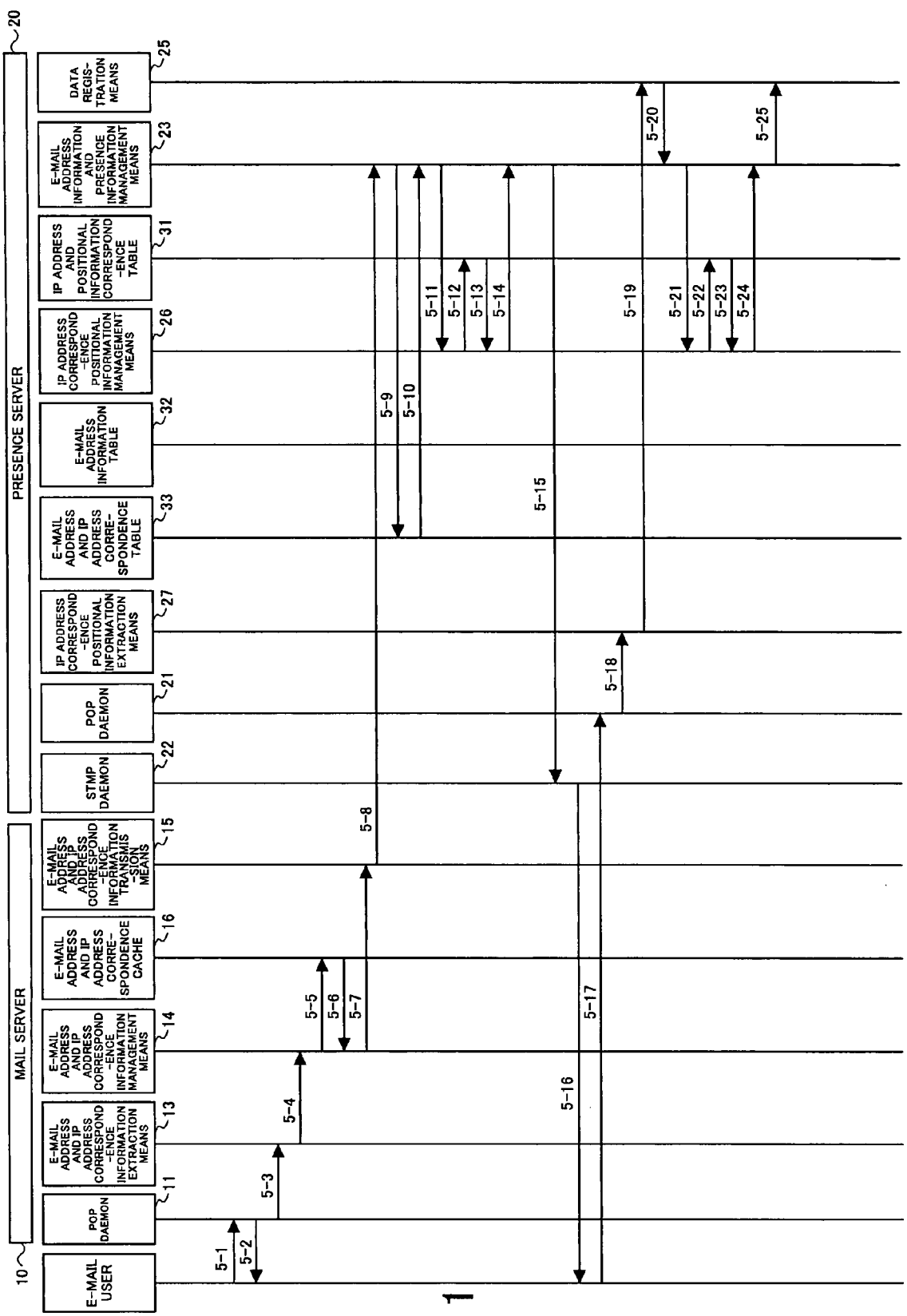
FIG. 11 is the operations sequence of the fifth embodiment of the system achieving the method of the present invention.

FIG. 10 shows the network configuration of the fifth embodiment of the system achieving the method of the present invention, and FIG. 11 shows the operations sequence of the fifth embodiment of the system achieving the method of the present invention.

In FIG. 10, an e-mail user is connected to a network through which the mail server 10 and the presence server 20 are available. The mail server 10 includes the POP daemon 11, the e-mail address and IP address correspondence information extraction means 13, the e-mail address and IP address correspondence information management means 14, the e-mail address and IP address correspondence information transmission means 15, and the e-mail address and IP address correspondence cache 16. The mail server 10 transmits and receives e-mail to and from the e-mail user through communications using the network. Further, the mail server 10 transfers presence information to and from the presence server 20. Here, presence information shall be transferred by the use of LDAP.

The presence server 20 is a server composed of the POP daemon 21, the SMTP daemon 22, the e-mail address information and presence information management means 23, the data registration means 25, the IP address correspondence positional information management means 26, the IP address correspondence positional information extraction means 27, the IP address and positional information correspondence table 31, the e-mail address information table 32, and the e-mail address and IP address correspondence table 33. The presence server 20 transfers information to and from "the user requesting presence information" by e-mail.

In case that a new location of an e-mail user is not managed by the presence server 20, it is necessary to register the positional information of a new IP address after requesting presence information.

<Registration of Presence Information>

Now, person α changes his/her location from base V to base Z to thereby change the presence information. As the registration of presence information is performed in the same manner as the first embodiment, description of it will be omitted (steps 5-1 through 5-10 of FIG. 11). Accordingly, the IP address "6.6.6.6" corresponding to the e-mail address of person α BBB@mail.fujitsu.com is registered in the e-mail address and IP address correspondence table 33 of the presence server 20.

After the e-mail address and IP address correspondence table 33 is updated, the e-mail address information and presence information management means 23 notifies the IP address correspondence positional information management means 26 of the registered IP address to confirm whether the registered IP address is present (step 5-11).

Now, if the IP address "6.6.6 6" is a new IP address and not present in the IP address and positional information correspondence table 31 (steps 5-12 and 5-13), the IP address correspondence positional information management means 26 notifies the e-mail address information and presence information management means 23 of the necessity of collecting positional information (step 5-14).

<Registration of Positional Information of New IP Address>

If the positional information of the newly-changed IP address is unknown, the e-mail address information and presence information management means 23 performs the procedure for inquiring of person α, who uses the terminal of the IP address "6.6.6.6," for the positional information to detect the unknown IP address.

As the procedure for inquiring about the positional information, the e-mail address information and presence information management means 23 requests the SMTP daemon 22 of the presence server 20 to transmit e-mail to the e-mail address BBB@mail.fujitsu.com so that the e-mail requesting the presence information (positional information) is transmitted to the e-mail address of person a BBB@mail.fujitsu.com (step 5-15).

The SMTP daemon 22 transmits a query e-mail about the positional information (address and telephone number) to the requested e-mail address BBB@mail.fujitsu.com (step 5-16).

The person α, who has received the query e-mail, enters the positional information (address and telephone number) about the IP address "6.6.6.6" in use in a given format and transmits e-mail to the presence server 20 (step 5-17).

The POP daemon 21 of the presence server 20 having received the e-mail, on which the positional information (address and telephone number) is entered, notifies the IP address correspondence positional information extraction means 27 of the content of the e-mail (step 5-18). The IP address correspondence positional information extraction means 27 extracts the positional information (address and telephone number) from the notified content of the e-mail and requests the data registration means 25 to execute processing (step 5-19).

The data registration means 25 requests the e-mail address information and presence information management means 23 to register data using the notified e-mail address and the positional information (address and telephone number) as a parameter and waits for the completion of the registration (step 5-20).

The e-mail address information and presence information management means 23, which has been requested to register data, requests the IP address correspondence positional information management means 26 to register the data using the notified the positional information (address and telephone number) including the IP address (step 5-21) and waits for a response.

The IP address correspondence positional information management means 26, which has been requested to register the data, registers the positional information (address and telephone number) in the IP address and positional information correspondence table 31 based on the notified IP address (steps 5-22 and 5-23). After completing the registration, the IP address correspondence positional information management means 26 notifies the e-mail address information and presence information management means 23 of the completion of the registration and completes the processing (step 5-24).

The e-mail address information and presence information management means 23, which has been notified of the completion of the registration, notifies the data registration means 25 of the completion of registering the data (step 5-25) and completes the processing. Then, the data registration means, which has been notified of the completion of registering the data, also completes the processing.

According to the present embodiment, even when a new IP address is added to an in-company LAN or positional information such as a corresponding telephone number is changed, it is possible to register positional information on the IP address in the presence server 20 just by registering information by e-mail, so that the use of presence information using the present server 20 becomes available.

Note that an IP address corresponds to a terminal address as described in claims, the IP address and positional information correspondence table 31 corresponds to a terminal address and presence information correspondence table, the e-mail address and IP address correspondence table 33 corresponds to an e-mail address and terminal address correspondence table, the steps 1-9 through 1-12 correspond to first extraction means, the steps 1-13 and 1-17 correspond to first retrieval means, the steps 1-14 and 1-18 correspond to first registration means, the steps 2-1 through 2-8 correspond to second retrieval means, the steps 2-9 and 2-10 correspond to third retrieval means, the steps 2-11 through 2-14 correspond to first e-mail transmission means, the steps 3-19 through 3-21 correspond to fourth retrieval means, the steps 3-23 and 3-24 correspond to telephone transfer control means, the steps 4-31 through 4-33 correspond to fifth retrieval means, the steps 4-35 and 4-36 correspond to notification means, the steps 5-15 and 5-16 correspond to second e-mail transmission means, and the steps 5-18 through 5-24 correspond to second registration means.

By the way, the present invention is not limited to the embodiments specifically disclosed herein, but various alterations and modifications may be applied without departing from the scope of the invention set forth in accompanying claims.

What is claimed is:

1. A location information management method of managing a location of a terminal of a user having an e-mail address, the method comprising:

extracting the e-mail address of the user and a terminal address of the terminal from an e-mail transmission request;

retrieving the terminal address from an e-mail address and terminal address correspondence table by using the extracted e-mail address;

registering the extracted terminal address in the e-mail address and terminal address correspondence table when the retrieved terminal address does not correspond to the extracted terminal address;

retrieving a location of the terminal from a terminal address and location information correspondence table by using the terminal address registered in the e-mail address and terminal address correspondence table, the terminal address and location information correspondence table retaining the terminal address and the location information indicating a location of the terminal in relation to each other;

transmitting e-mail requesting location information to the user who has issued an e-mail transmission request with a changed terminal address when the terminal address is changed in the e-mail address and terminal address correspondence table and the changed terminal address is not registered in the terminal address and location information correspondence table; and extracting location information from the e-mail which is transmitted by the user, on which the location information is entered, and which is to be registered in the terminal address and location information correspondence table.

2. The location information management method according to claim 1, further comprising:

retrieving, in response to a request for a mailing list in which a location is designated, a list of the terminal addresses corresponding to the location from the terminal address and location information correspondence table by using positional information corresponding to the location;

retrieving the e-mail addresses from the e-mail address and terminal address correspondence table by using a retrieved list of the terminal addresses; and transmitting e-mail to the retrieved e-mail addresses.

3. The location information management method according to claim 1, further comprising:

setting the use of a telephone transfer function of a private branch exchange by the user;

retrieving, when the terminal address of the user making use of the telephone transfer function is changed in the e-mail address and terminal address correspondence table, the terminal address and location information correspondence table by using the terminal address before the change and the terminal address after the change; and presenting the telephone number of the location information retrieved by using the terminal address before the change and the telephone number of the location information retrieved by using the terminal address after the change to the telephone transfer function of the private branch exchange so as to transfer a telephone call.

4. The location information management method according to claim 1, further comprising:

requesting a change notification of an absent user;

retrieving the location information from the terminal address and location information correspondence table by using a changed terminal address when the terminal address is changed in the e-mail address and terminal address correspondence table; and notifying the user requesting the change notification of the retrieved location information.

5. A location information management system, the system comprising:

a first extraction part configured to extract an e-mail address of a user and a terminal address of a terminal from an e-mail transmission request;

a first retrieval part configured to retrieve the terminal address from an e-mail address and terminal address correspondence table by using the extracted e-mail address;

a first registration part configured to register the extracted terminal address in the e-mail address and terminal address correspondence table when the retrieved terminal address does not correspond to the extracted terminal address;

a second retrieval part configured to retrieve a location of the terminal from a terminal address and location information correspondence table by using the terminal address registered in the e-mail address and terminal address correspondence table, the terminal address and location information correspondence table retaining the terminal address and the location information indicating a location of the terminal in relation to each other;

a second e-mail transmission part configured to transmit e-mail requesting location information to the user who has issued an e-mail transmission request with a changed terminal address when the terminal address is changed in the e-mail address and terminal address correspondence table and the changed terminal address is not registered in the terminal address and location information correspondence table; and a second registration part configured to extract location information from e-mail which is transmitted by the user, on which the location information is entered, and which is to be registered in the terminal address and location information correspondence table.

6. The location information management system according to claim 5, further comprising:

a third retrieval part configured to retrieve, in response to a request for a mailing list in which a location is designated, a list of the terminal addresses corresponding to the location from the terminal address and location information correspondence table by using positional information corresponding to the location;

a fourth retrieval part configured to retrieve the e-mail addresses from the e-mail address and terminal address correspondence table by using a retrieved list of the terminal addresses; and a first e-mail transmission part configured to transmit e-mail to the retrieved e-mail addresses.

7. The location information management system according to claim 5, further comprising:

a fifth retrieval part configured to retrieve, when the use of a telephone transfer function of a private branch exchange is set by the user and the terminal address of the user making use of the telephone transfer function is changed in the e-mail address and terminal address correspondence table, the terminal address and location information correspondence table by using the terminal address before the change and the terminal address after the change; and a telephone transfer control part configured to present the telephone number of the location information retrieved by using the terminal address before the change and the telephone number of the location information retrieved by using the terminal address after the change to the telephone transfer function of the private branch exchange so as to transfer a telephone call.

8. The location information management system according to claim 5, further comprising:

a sixth retrieval part configured to retrieve the location information from the terminal address and location information correspondence table by using a changed terminal address when a change notification of an absent user is requested and the terminal address is changed in the e-mail address and terminal address correspondence table; and a notification part configured to notify the user requesting the change notification of the retrieved location information.

* * * * *

UNITED STATES PATENT AND TRADEMARK OFFICE
CERTIFICATE OF CORRECTION

PATENT NO. : 8,717,973 B2
APPLICATION NO. : 11/898710
DATED : May 6, 2014
INVENTOR(S) : Yuji Ito et al.

It is certified that error appears in the above-identified patent and that said Letters Patent is hereby corrected as shown below:

On the Title Page, Item (54) and in the Specification, Column 1 should read

-- LOCATION INFORMATION MANAGEMENT METHOD AND LOCATION INFORMATION MANAGEMENT SYSTEM --

Signed and Sealed this
Twelfth Day of August, 2014

Michelle K. Lee
*Deputy Director of the United States Patent and Trademark Office*